US008751645B2

(12) United States Patent
Mounaouar et al.

(10) Patent No.: US 8,751,645 B2
(45) Date of Patent: Jun. 10, 2014

(54) LATTICE BASED TRAFFIC MEASUREMENT AT A SWITCH IN A COMMUNICATION NETWORK

(75) Inventors: Omar Mounaouar, Montreal (CA); Petko Valtchev, Montreal (CA); Omar Cherkaoui, Montreal (CA); Laurent Marchand, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 160 days.

(21) Appl. No.: 13/554,853

(22) Filed: Jul. 20, 2012

(65) Prior Publication Data
US 2014/0032736 A1    Jan. 30, 2014

(51) Int. Cl.
*G06F 15/173* (2006.01)
(52) U.S. Cl.
USPC ............ 709/224; 709/223; 709/238; 709/242
(58) Field of Classification Search
USPC ................ 709/224, 223, 238, 242, 225, 231;
370/395.42, 235, 236, 230.1, 329;
726/1; 702/24
See application file for complete search history.

(56) References Cited

U.S. PATENT DOCUMENTS

| 7,376,731 | B2 | 5/2008 | Khan et al. | |
|---|---|---|---|---|
| 7,639,613 | B1 | 12/2009 | Ghannadian et al. | |
| 7,649,853 | B1 | 1/2010 | Nucci et al. | |
| 8,467,342 | B2 * | 6/2013 | Loh et al. | 370/329 |
| 2004/0213265 | A1 * | 10/2004 | Oueslati et al. | 370/395.42 |
| 2005/0132044 | A1 * | 6/2005 | Guingo et al. | 709/225 |
| 2007/0055789 | A1 * | 3/2007 | Claise et al. | 709/234 |
| 2007/0258372 | A1 * | 11/2007 | Nadeau et al. | 370/235 |
| 2008/0025218 | A1 * | 1/2008 | Liu | 370/235 |
| 2009/0161547 | A1 * | 6/2009 | Riddle et al. | 370/236 |
| 2010/0061235 | A1 * | 3/2010 | Pai et al. | 370/230.1 |
| 2011/0238855 | A1 * | 9/2011 | Korsunsky et al. | 709/231 |
| 2012/0079101 | A1 * | 3/2012 | Muppala et al. | 709/224 |
| 2012/0240185 | A1 * | 9/2012 | Kapoor et al. | 726/1 |
| 2012/0310548 | A1 * | 12/2012 | Takahashi | 702/24 |

OTHER PUBLICATIONS

Estan, Christian, et al., "Automatically Inferring Patterns of Resource Consumption in Network Traffic", *SIGCOMM 2003*, Aug. 25-29, 2003, Karlsruhe, Germany, 12 pages.
International Search Report and Written Opinion, Application No. PCT/IB2013/001578, dated Dec. 2, 2013, 13 pages.
Brownlee, N, et al., "Traffic Flow Measurement: Architecture", *Network Working Group*, Request for Comments: 2722, Oct. 1999, 48 pages, The Internet Society.
Valtchev, Petko, et al., "Formal Concept Analysis for Knowledge Discovery and Data Mining: The New Challenges", Feb. 6, 2004, pp. 352-371.
Yuan, Lihua, et al., "ProgME: Towards Programmable Network MEasurement", Feb. 2011, pp. 115-128, *IEEE/ACM Transactions on Networking*, vol. 19, No. 1, IEEE.

* cited by examiner

*Primary Examiner* — Le H Luu
(74) *Attorney, Agent, or Firm* — Blakely, Sokoloff, Taylor & Zafman LLP

(57) ABSTRACT

A lattice of interconnected concepts is constructed from flow entries. Each concept describes a subset of flows and a subset of the flow attributes. Based on user queries, the lattice is used to build disjoint sets of flows referred to as flowsets. Each user query specifies one or more of the flow attributes to be measured. Each flowset includes one or more of the flows to thereby enable sharing of the hardware counters among the flows. One hardware counter is then assigned to each flowset.

18 Claims, 7 Drawing Sheets

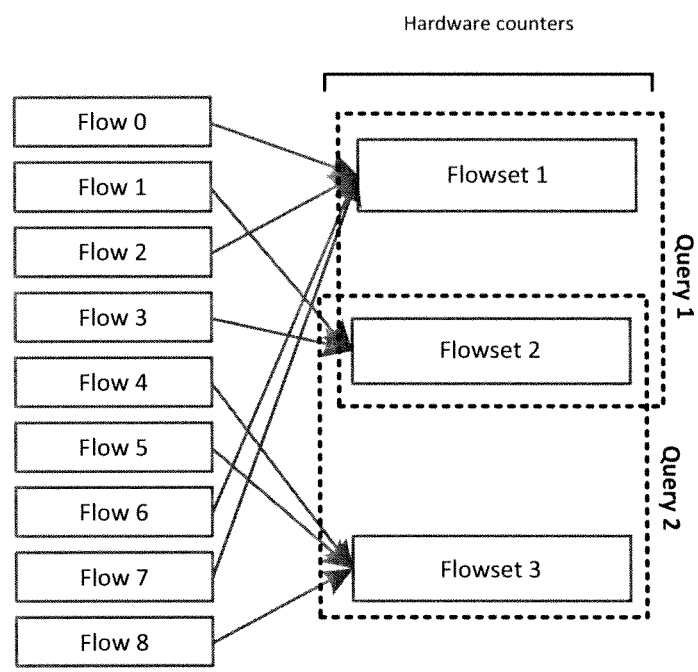
Figure 1: Illustration of flow aggregation

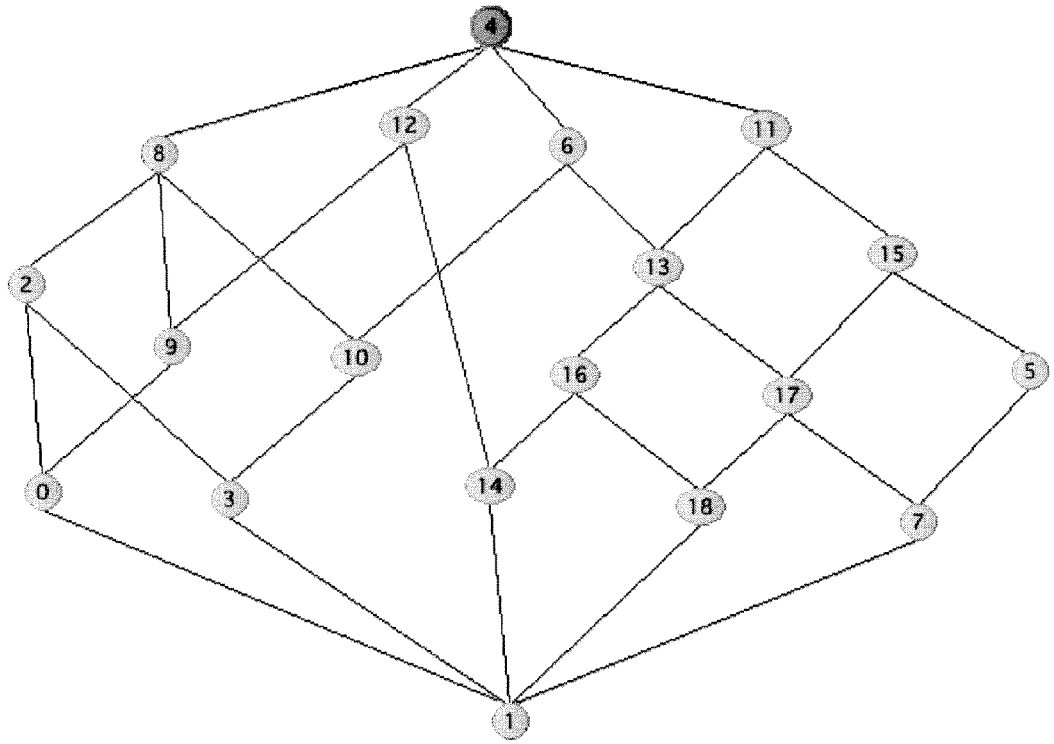
Figure 2: A sample complete lattice made of 19 nodes
|  | H1 | H2 | H3 | H4 | H5 | H6 | H7 | H8 | H9 | H10 |
|---|---|---|---|---|---|---|---|---|---|---|
|  | Ingress Port = 1 | Ingress Port = 2 | Ingress Port = 3 | MAC src = 00:00:00:00:00:01 | MAC dst = 00:00:00:00:00:12 | IPv4 src = 132.208.130/32 | IPv4 src = 10/8 | IPv4 dst = 10/8 | IPv4 dst = 132.208.130.1 | Layer 4 dst port = 21 |
| flow 0 | x |  |  | x |  |  | x |  | x |  |
| flow 1 | x |  |  | x | x |  | x |  |  | x |
| flow 2 |  | x |  |  |  | x |  | x |  |  |
| flow 3 |  | x |  |  |  | x |  | x |  | x |
| flow 4 | x |  |  |  |  |  | x | x |  |  |
| flow 5 | x |  |  |  | x |  | x |  |  | x |
| flow 6 |  |  | x |  |  | x |  |  | x | x |
| flow 7 |  |  | x |  |  | x |  | x |  | x |
Figure 3: FlowME Input Context

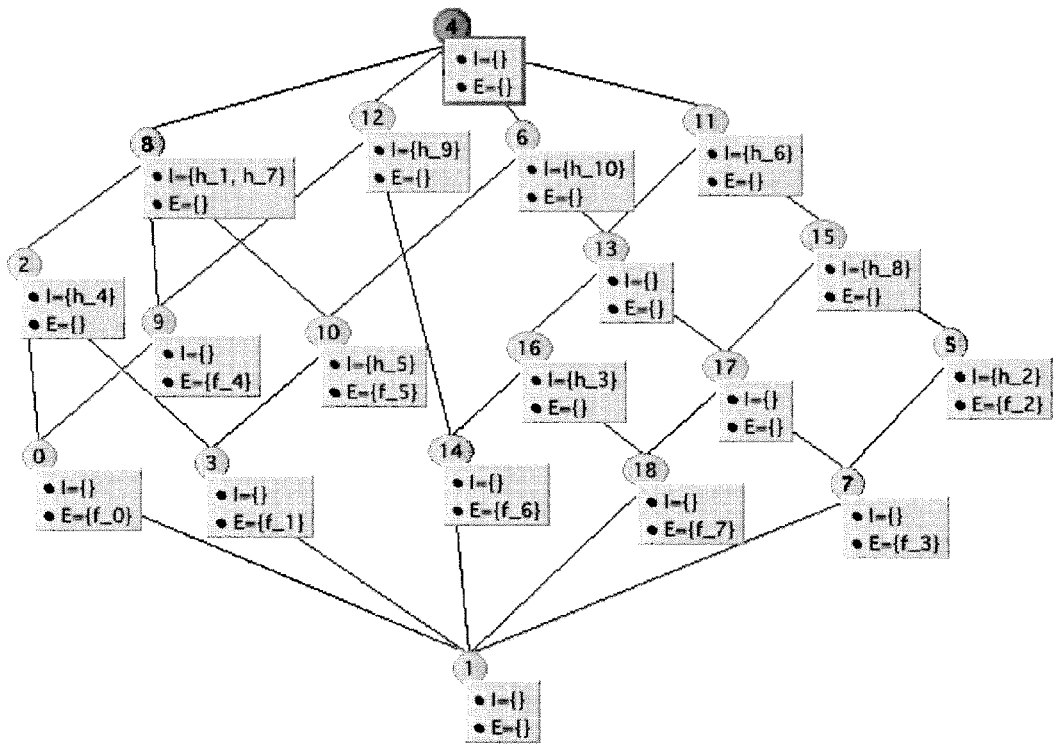
Figure 4: FlowME concept lattice
|  | H1 | H2 | H3 | H4 | H5 | H6 | H7 | H8 | H9 | H10 |
|---|---|---|---|---|---|---|---|---|---|---|
|  | Ingress Port = 1 | Ingress Port = 2 | Ingress Port = 3 | MAC src = 00:00:00:00:00:01 | MAC dst = 00:00:00:00:00:12 | IPv4 src = 132.208.130/32 | IPv4 src = 10/8 | IPv4 dst = 10/8 | IPv4 dst = 132.208.130.1 | Layer 4 dst port = 21 |
| flow 0 | x |  |  | x |  |  | x |  | x |  |
| flow 1 | x |  |  | x | x |  | x |  |  | x |
| flow 2 |  | x |  |  |  | x |  | x |  |  |
| flow 3 |  | x |  |  |  | x |  | x |  | x |
| flow 4 | x |  |  |  |  |  | x |  | x |  |
| flow 5 | x |  |  |  | x |  | x |  |  | x |
| flow 6 |  |  | x |  |  | x |  |  | x | x |
| flow 7 |  |  | x |  |  | x |  | x |  | x |
| flow 8 |  | x |  |  |  |  | x |  | x |  |
Figure 5: Extended input context

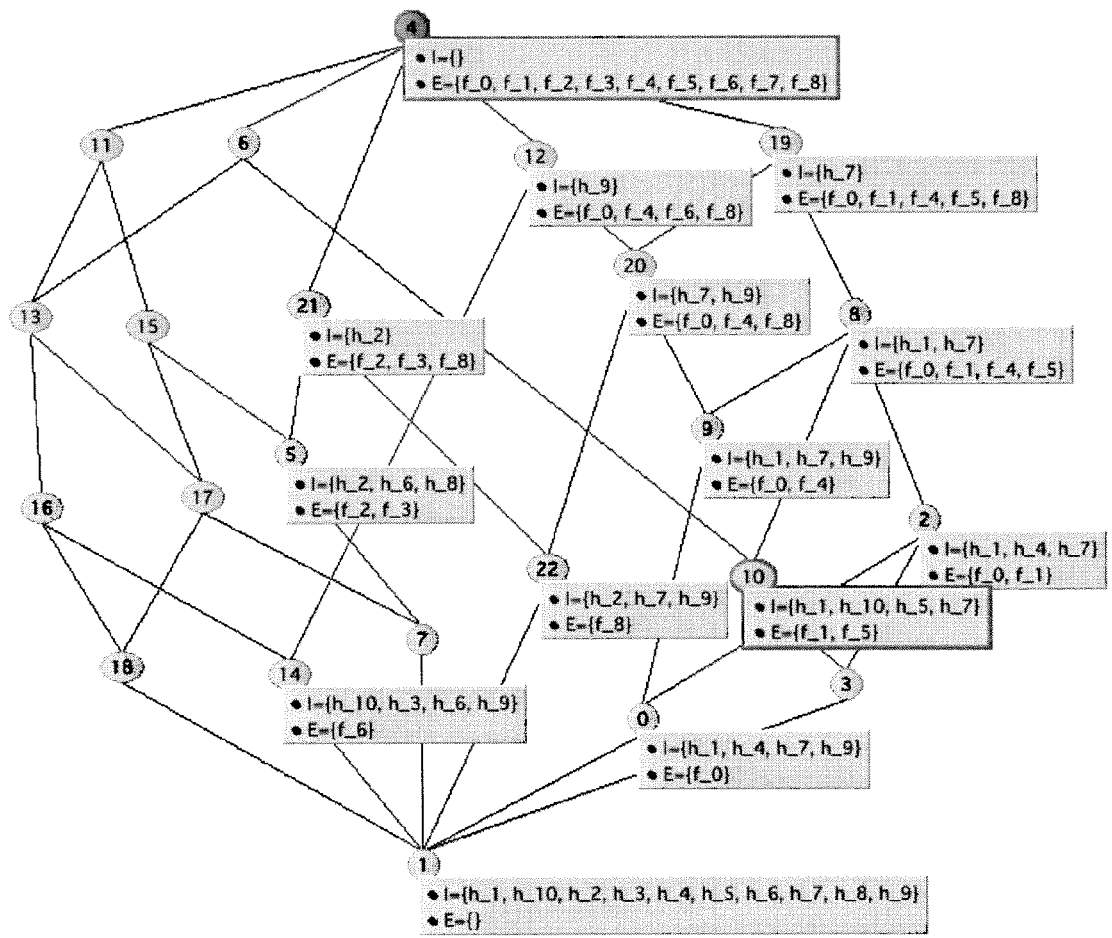
Figure 6: The concept lattice of the extended context

LATTICE BASED TRAFFIC MEASUREMENT AT A SWITCH IN A COMMUNICATION NETWORK

TECHNICAL FIELD

Embodiments of the invention relate generally to communication networks. More particularly, embodiments of the invention relate to network traffic measurement.

BACKGROUND

Network traffic measurement allows network managers to monitor network activities and to plan for network operations. Tools for measuring traffic need to scale with a wide spectrum of applications, flows and queries while maintaining the performance of the underlying hardware in terms of accuracy and speed. Conventional solutions sample traffic and send per-flow statistics to a remote server that serves user applications. Measuring per-flow traffic often results in inaccuracy and sending per-flow statistics often results in intensive resource and network bandwidth usage.

Conventional flow-based measurement techniques generally use a large number of managed hardware counters due to a direct correlation between the number of counters and the flow table size. Further, conventional techniques typically gather per-flow statistics continually in dataplane without consideration of application needs. It is up to user applications to pull desired flow counters. This disconnection between user applications and traffic measurement induces a large number of transactions, excessive bandwidth usage and may affect packet processing performances.

For example, Cisco Netflow is a data monitoring and collection system. In a Netflow-capable switch or router, flow statistics are tracked at the datapath continuously at a specific sampling rate. Statistics of each flow are sent to a Netflow Data Collector which serves user applications. The Netflow-capable switch creates a number of transactions with a bandwidth usage proportional to the number of flows regardless of the actual need of the applications.

A recent approach to reducing the number of hardware counters was proposed in *ProgME: towards programmable network measurement, IEEE/ACM Transactions on Networking, February* 2011, vol. 19, No. 1. The architecture proposed there is based on analyzing individual packets contents with a binary decision diagram (BDD), and finding out an optimal allocation of flows using a Disentangling algorithm. However, there is no evidence of convergence or optimality for the Disentangling algorithm especially with large flow descriptors such as in the context of OpenFlow capable switches.

SUMMARY

According to one embodiment of the invention, a method is provided for assigning hardware counters to flows that pass through a switch in a communication network for performing measurement at the switch. Each of the flows is associated with a set of flow attributes. A lattice of interconnected concepts is constructed by a processor from flow entries available at the switch, each concept describing a subset of the flows and a subset of the flow attributes. A set of user queries is received by the processor, where each user query specifies one or more of the flow attributes to be measured. Based on the user queries, the processor identifies disjoint flowsets from the lattice. At least one of the flowsets includes more than one of the flows to enable sharing of the hardware counters among the flows belonging to the same flowset. One hardware counter is then assigned to each flowset.

According to another embodiment of the invention, a computing device in a communication network is provided to assign hardware counters to flows that pass through a switch for performing measurement at the switch. Each of the flows is associated with a set of flow attributes. The computing device includes input circuitry adapted to receive flow entries available at the switch and a set of user queries, where each user query specifies one or more of the flow attributes to be measured. The computing device also includes a processor. The processor further includes a concept generator module adapted to construct a lattice of interconnected concepts from the flow entries, each concept describing a subset of the flows and a subset of the flow attributes; a flowset builder module adapted to identify disjoint flowsets from the lattice based on the set of user queries, at least one of the flowsets comprising more than one of the flows to enable sharing of the hardware counters among the flows belonging to the same flowset; and a counter placement module adapted to assign one hardware counter to each flowset. The computing device further includes output circuitry to output a mapping between flow identifiers and hardware counter identifiers to the switch for assignment of the hardware counters.

BRIEF DESCRIPTION OF THE DRAWINGS

Embodiments are illustrated by way of example and not by way of limitation in the figures of the accompanying drawings, in which like references indicate similar elements. It should be noted that references to "an" or "one" embodiment in this disclosure are not necessarily to the same embodiment, and such references mean at least one.

FIG. 1 illustrates an example of hardware counter assignment with flow aggregation.

FIG. 2 illustrates an example of a lattice.

FIG. 3 illustrates an example of an input context according to one embodiment of the invention.

FIG. 4 illustrates an example of a concept lattice for the input context of FIG. 3 according to one embodiment of the invention.

FIG. 5 illustrates an example of an extended input context according to one embodiment of the invention.

FIG. 6 illustrates an example of a concept lattice for the extended input context of FIG. 5 according to one embodiment of the invention.

DETAILED DESCRIPTION

Figure 7:
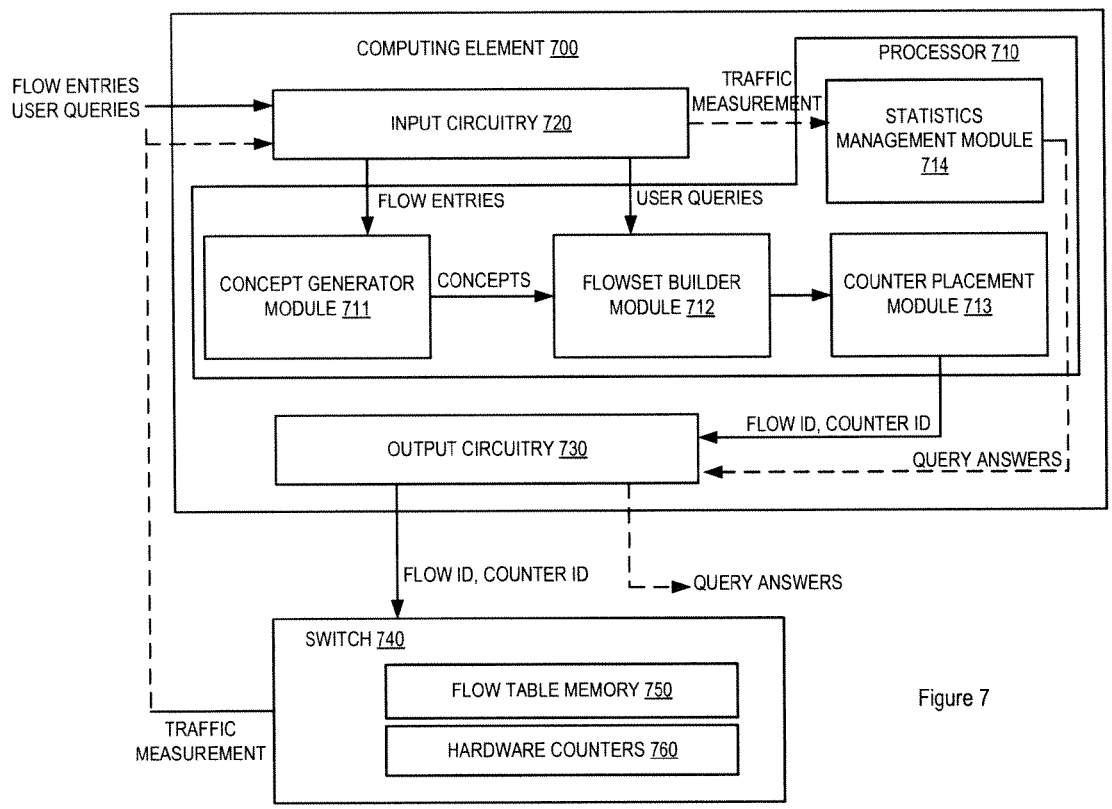
FIG. 7 illustrates a computing device that performs counter assignment according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a framework based on the lattice theory for improving the scalability and performance of flow-based measurements. This lattice-based framework is referred to as the FlowME framework. The framework minimizes the number of hardware counters that need to be maintained, and reduces device-to-users transactions and bandwidth required for achieving accurate traffic measurements. The framework adapts the measurement strategy to application needs and manages application's queries (also referred to as user queries) by assigning hardware counters for disjoint sets of flow entries instead of individual flow entries. The lattice-based framework has been shown to generate the minimal number of hardware counters for answering user queries.

The FlowME traffic measurement framework enables fine-grain querying of the network traffic flows and extracting of the query-bound flow measurements. To that end, a hierarchy of high-level, flows-to-matchfields abstractions is constructed and used to support query answering. This hierarchy of abstractions is referred to as a lattice, a concept lattice, or a lattice structure. The approach relies on basic results from the lattice theory to elaborate the concept lattice, winch is used to factor out answer flowsets that are common to several queries. A further benefit of the lattice structure is to enable a better-informed process of counter assignment, under the assumption that all of the queries from a given set are provided with statistics while each flow increases at most one counter. The approach establishes a trade-off that provenly minimizes the storage space with respect to the number of counters. To that end, a sub-structure of the aforementioned lattice is identified that embodies a flows-to-queries mapping. Thus, the lattice-based framework can take advantage of indistinguishableness between flows, allowing for a reduction in the overall number of counters.

The framework further supports evolution in the concrete parameters of the overall traffic measurement. Evolution scenarios include changes in the collections of queries and/or flows, with or without extending the underlying set of match-field expressions. The maintenance of both the flow-to-matchfield lattice and its flow-to-query substructure relies on the same lattice theory body of knowledge about lattice evolution upon changes in the input data. Once more, the mathematical foundations of the approach allow the maintenance overhead to be kept to a minimum.

The framework also adapts to conventional switch hardware resources and requires no additional infrastructure. The framework integrates with flow entries data structure and performs measurements simultaneously with traffic processing. The framework can be exploited in a wide range of router architectures including Openflow switches.

FIG. 1 illustrates an example of flow aggregation according to one embodiment of the invention. This example shows a flow-centered approach in which multiple flows are aggregated into a flow set, and each query corresponds to one or more flow sets. Flows in the same flow set can share the same hardware count Definitions of the terminology used herein are provided below.

A flow entry, denoted f is composed of a set of match fields (equivalently, flow attributes) that defines the flow, a counter and a set of instructions. When a packet matches f, instructions are performed and counter associated to f is updated.

The set of installed flows in a specific switch is denoted $\mathcal{F}$. A match field is an attribute of a flow. The set of match field values is denoted $\mathcal{H}$.

A user query q∈Q is a sequence of regular expressions on flow match fields values. In our demonstration, a user query is modelled by the attributes of traffic it selects. For example, a query formulated as "how much FTP traffic is received from node 10.0.0.1?" is represented by $q=\{h_1, h_2\}$ where $h_1=10.0.0.1$ is a field describing traffic from 10.0.0.1, and $h_2=21$ describes FTP traffic. In the following, we use the set of queries $Q=\{q_1, q_2, q_3, q_4, q_5\}$ where $q_1=\{h_{10}\}$, $q_2=\{h_2, h_6, h_8\}$, $q_3=\{h_1\}$, $q_4=\{h_1, h_4, h_7\}$ and $q_5=\{h_7\}$.

A concept c is a pair of sets (F, H), where $F\in\wp(\mathcal{F})$ and $H\in\wp(\mathcal{H})$. The flowset F is called the extent and H the intent of the concept. The notation $\wp$ represents a powerset; the powerset of any set S is the set of all subsets of S, including the empty set and S itself.

Hardware counters are memory or registers that are incremented when a flow is matched. Each flow entry contains a reference to a hardware counter.

The framework described herein provides exact statistics and more flexibility in traffic measurement while minimizing the number of needed hardware counters. One key element that enables reduction of the number of counters is factorization. Factorization involves hierarchically aggregating elements sharing the same attributes. For example, using flexible 5 match field rules, if user queries are focused on {DestIP and SrcIP} fields, the framework will reduce automatically the measurement space (typically $2^{104}$ possible counters) by factorizing the processed flow entries sharing the same DestIP and SrcIP fields, and then assigning a counter to the specific aggregate that answers user queries. It has been proved that the use of a lattice is optimal for performing the proposed factorization. Further, the lattice can be constructed and updated quickly, allowing both real-time and exact statistics.

1 Theoretical Results Underlying the FlowME Framework

In the following, the theoretical results underlying the FlowME framework are described. The theory results are derived based on the formal concepts analysis (FCA). As FCA sprang off the lattice theory, it is helpful to recall some useful notions related to lattices and ordered structures in general.

The Basics of Ordered Structures

Given an arbitrary set G, the structure $P=\langle G, \leq_P \rangle$ is a partial order (poset) over G provided $\leq_P \subset G\times G$ is a reflexive, antisymmetric and transitive binary relation. For any pair of members a, b∈G, if $b\leq_P a$ means a is greater than or equal to b, whereas if neither $b\leq_P a$ nor $a\leq_P b$ holds, then a and b are incomparable. Assume $G=\{g_0, g_1 \ldots g_{18}\}$ whereas $\leq_P=\{(g_8, g_4), (g_2, g_8), \ldots\}$. By reflexivity of $\leq_P$, we can deduce that $(g_8, g_8)\in\leq_P$ whereas by transitivity on the first two pairs $(g_2, g_4)\in\leq_P$.

Furthermore, any c∈G such that $c\leq_P a$ and $c\leq_P b$ is called lower bounds of a and b (upper bounds are dual). The precedence relation $\prec_P$ in P is the transitive reduction of $\leq_P$, i.e. a $\prec_P b$ if $a\leq_P b$ and all c such that $a\leq_P c\leq_P b$ satisfy c=a or c=b. Given such a pair, a will be referred to as an immediate child of b and b as an immediate parent of a, č and ĉ respectively. Usually, P is visually represented by its covering graph Cov $(P)=\langle G, \prec_P\rangle$. A drawing of the covering graph where edges are systematically going upwards hence their orientation is skipped is called the Hasse diagram of P. FIG. 2 illustrates an example of the Hasse diagram of the aforementioned 19 element-strong poset. Following the drawing, $g_2\prec_P g_8$, hence $g_8$ is the unique immediate successor of $g_2$. Moreover, $g_8$ is an upper bound for $g_2$ and $g_9$, while $g_0$ is a lower bound for $g_2$ and $g_8$ (as well as $g_9$).

A lattice $L=\langle G, \leq_L \rangle$ is a poset where any pair of elements a, b admits a unique greatest lower bound $(a \wedge_L b)$ and a unique least upper bound $(a \vee_L b)$. $\wedge_L$ and $\vee_L$ represent binary operators on G called join and meet, respectively. In a complete lattice L, joins and meets generalize to arbitrary sets $A \subseteq G$, i.e., $\vee_L A$ and $\wedge_L A$ necessarily exist. In particular, there are unique maximal (top, $T = \wedge_L G = \vee_L \emptyset$) and minimal (bottom, $\bot = \vee_L G = \wedge_L \emptyset$) elements in such a lattice. The poset illustrated in the example of FIG. 2 is a lattice and, as it is finite, it is automatically complete lattice as well. For instance, following the drawing, $g_3 \vee_L g_7 = g_6$, $g_2 \vee_L g_8 = g_8$ and $g_2 \vee_L g_6 = g_3$. Furthermore, $\vee_L \{g_5, g_{14}, g_{18}\} = g_{11}$.

A structure with only one of the above operations is called semi-lattice, e.g., the existence of a unique meet for any couple (set) of elements implies a (complete) meet semi-lattice structure. Consequently, a (complete) lattice is the superposition of two (complete) semi-lattices, one for each of the operators.

Input Data in FCA

In FCA, data is represented as a set of individual observations with proper descriptors which are akin to unary predicates. It is introduced as an object-to-attribute cross-table, called a (formal) context. Formally speaking, a context $\mathcal{K}$ (O, A, I) associates a set of objects O to a set of attributes A through an incidence relation $I \subset O \times A$. A pair of the incidence relation oIa is interpreted as indicating that the object o has the attribute a.

According to one embodiment of the invention, FCA can be applied to traffic measurement, in which objects are system flows f whereas flow attributes are match field expressions h. Consequently, the resulting context will be denoted $\mathcal{K}(\mathcal{F}, \mathcal{H}, M)$ where $\mathcal{F}$ is the universal flow set supported by the system and $\mathcal{H}$ the total set of match field expressions admitted by the system. Their incidence is expressed through the "match" relation $M \subset \mathcal{F} \times \mathcal{H}$ where a pair $(f, h) \in M$ means "the flow f satisfies the match field h".

FIG. 3 illustrates an example of a context according to one embodiment of the invention. The context has two dimensions: a flow dimension and a flow attribute (match field) dimension. The context includes context entries marked by Xs in the cross-table of FIG. 3. This context will be used in the following description as a running example.

Formal Concepts and their Lattice

Using FCA, conceptual descriptions can be extracted from the context by factoring out description shared by individuals context elements. Generally speaking, the basic FCA method pinpoints all maximal sets of shared descriptors which, clearly, translate regularities in the distribution of those descriptors. Geometry-wise, these materialize as maximal rectangles of the cross-table that are made of Xs (not necessarily contiguous). These are naturally ordered with respect to set-theoretic inclusion, either on the object or the attribute dimensions. The resulting partially ordered set of descriptions represents a complete lattice.

Formally, the factoriztion is rooted in a pair of maps that lift the incidence relation to the set level. Thus, each set of flows maps to the set of shared match fields and vice versa. Due to their symmetric nature, both are denoted by ' in FCA. Applying FCA to the context of the traffic measurement example of FIG. 3, the mapping is defined as follows:

Definition

The operator ' a set of flows into a set of all common match fields, and a set of match fields into the set of all flows that satisfy them:

$': \wp(\mathcal{F}) \to \wp(\mathcal{H}), F' = \{h \in \mathcal{H} \mid \forall f \in F, (f,h) \in M\}$, $': \wp(\mathcal{H}) \to \wp(\mathcal{F}), H' = \{f \in \mathcal{F} \mid \forall h \in H, (f,h) \in M\}$.

With respect to the running example in FIG. 3, $\{f_3, f_6\}' = \{h_6, h_{10}\}$ and $\{h_2, h_6\}' = \{f_2, f_3\}$.

The compound operators l made by subsequently applying each of the above ' operators map each powerset $\wp(\mathcal{F})$ and $\wp(\mathcal{H})$ into itself. Both knowingly represent closure operators which means, in particular, that $X \subseteq X''$ and $(X'')''=X''$ for any flow set $(X \in \wp \mathcal{F})$ and any math field set $(X \in \wp \mathcal{H})$. Each of the '' operators thus induces a family of closed subsets or closures, i.e., such that $X = X''$, which will be denoted here $\mathcal{F} \subseteq \wp(\mathcal{C}_\mathcal{K}^f)$ and $\mathcal{C}_\mathcal{K}^h \subseteq \wp(\mathcal{H})$. For instance, $\{f_3, f_6\}$ is not closed since it is strictly included in its closure $\{f_3, f_6\} \neq \{h_6, h_{10}\}' = \{f_3, f_6, f_7\}$; $\{f_3, f_6, f_7\} = \{f_3, f_6, f_7\}''$ is obviously closed. It is easily seen that a closure operator induces an equivalence relation on the respective powerset: two sets are equivalent whenever they have the same closure (e.g., obviously $\{f_3, f_6\} \equiv \{f_3, f_6, f_7\}$).

Moreover, such a family of closures is itself closed by set-theoretic intersection $\cap$, i.e., the intersection of ally subset of closures is itself a closure. This regularity translates structurally: whenever the closure family provided with the set-theoretic inclusion $\subseteq$, the resulting poset is a semi-lattice.

FCA focuses on a two-dimensional structure that superimposes both semi-lattices of a given context. To that end, the natural one-to-one correspondence is captured in the notion of formal concept.

Definition

A concept is a pair of sets (F, H) where $F \in \wp(\mathcal{F})$, $H \in \wp(\mathcal{H})$, F=H' and H=F'. F is called the extent and H the intent of the concept.

For instance, in above context $(\{f_3, f_6, f_7\}, \{h_6, h_{10}\})$ is a concept, whereas $(\{f_3, f_6\}, \{h_6, h_{10}\})$ is not.

Furthermore, the set $\mathcal{C}_\mathcal{K}$ of all concepts of a context $\mathcal{K}$ is partially ordered by intent/extent inclusion:

$(F_1, H_1) \leq_\mathcal{K} (F_2, H_2) \Leftrightarrow F_1 \subseteq F_2, H_2 \subseteq H_1$.

The partial order $\langle \mathcal{C}_\mathcal{K}, \leq_\mathcal{K} \rangle$ actually forms a complete lattice, called the concept lattice (sometimes Galois lattice as well) whereby the lattice operators are given in the following property.

Theorem 1.1

$\mathcal{L}_\mathcal{K} = \langle \mathcal{C}_\mathcal{K}, \leq_\mathcal{K} \rangle$ is a complete lattice with join and meet defined as follows:

$\vee_{i=1}^k (F_i, H_i) = ((\cup_{i=1}^k F_i)'', \cap_{i=1}^k H_i)$, $\wedge_{i=1}^k (F_i, H_i) = (\cap_{i=1}^k F_i, (\cup_{i=1}^k H_i)'')$.

The above theorem indicates that intersection of intents/extents is necessarily an intent f extent whereas union might not be.

The Hasse diagram of the lattice $\mathcal{L}_\mathcal{K}$ drawn from the running example of FIG. 3 is shown in FIG. 4, where concepts are identified by integer numbers whereas intents and extents are labels introduced by annotations I and E, respectively. For instance, the join and the meet of the concepts $c_5$ and $c_{13}$ are $c_{11}$ and $c_7$, respectively.

For the sake of instead of showing complete sets of intents and extents, FIG. 4 shows reduced intents and extents. Thus, the concept $c_{13}$ which at first sight might seem to be totally void, actually has non void intent and extent, $c_{13}=(\{f_3, f_6, f_7\}, \{h_6, h_{10}\})$. In fact, reduced labelling uses a ground property of concept lattices stating that for each $f \in \mathcal{F}$ ($h \in \mathcal{H}$), there is a unique minimal (maximal) concept $c=(F, H)$ such that $f \in F$ ($h \in H$).

Property 1.2

To each element of a context $\mathcal{K}(\mathcal{F}, \mathcal{H}, M)$ corresponds an external concept:

$\forall f \in \mathcal{F}$, the flow concept $(\{f\}'', \{f\}')$ is the minimal concept among all those comprising $\forall h \in \mathcal{H}$, the match field concept $(\{h\}', \{h\}'')$ is the maximal concept among all those comprising h.

Following the above property, two auxiliary functions are defined.

Definition

The functions $\mu$ and $\nu$ map context elements into their respective external concepts as follows:

$\mu: \mathcal{F} \to \mathcal{C}_{\mathcal{K}}$ with $\mu(f)=(\{f\}'', \{f\}')$, $\nu: \mathcal{H} \to \mathcal{C}_{\mathcal{K}}$ with $\nu(h)=(\{h\}', \{h\}'')$, Back to Hasse diagrams and labeling, each f (h) can be explicitly drawn in the extent (intent) of $\mu(f)$ ($\nu(h)$) while all other relevant concepts would "inherit" it from that concept upwards (downwards). Thus, the extent of $c_7=(\{f_3\}, \{h_2, h_6, h_8, h_{10}\})$ is the H on of the extents of $c_5=(\{f_2, f_3\}, \{h_2, h_6, h_8\})$ and $c_{13}=(\{f_3, f_6, f_7\}, \{h_6, h_{10}\})$.

In summary, concept lattices factor out all the shared descriptions among a collection of individuals and hence comprise all maximal groups of such individuals together with the shared descriptors. Furthermore, the Hasse diagram provides a hierarchical organization of all concepts which may be used both to speed-up their computation and for subsequent retrieval. This might prove particularly useful when the set of concepts is to be generated dynamically, i.e., upon changes in the context.

Computational and Complexity Issues

In the following, an algorithm (Algorithm 1) for lattice construction is described below. The algorithm builds the concepts and their relations based on flow entries. It constructs the lattice top-down, i.e., starting at the top concept and moving downwards. At each concept, it generates the set of its lower covers. To that end, it first produces the extents of a larger set of sub-concepts (yet not all of the sub-concepts) by intersection of the concept extent with the images of all matchfields that are not in the concept intent. It is easily shown that the lower covers are then the maxima of the resulting concept set.

The algorithm connects the concept to each of its lower covers and adds those to the queue of concepts waiting to be processed. For instance, at concept $c_8=(\{f_0, f_1, f_4, f_5\}, \{h_1, h_7\})$ in the example of FIG. 4, the algorithm produces the following four extents: $\emptyset$ (by separate intersections with $(h'_2, h'_3, h'_6, $ and $h'_8)$, $\{f_0, f_1\}$ (with $h'_4$), $\{f_1, f_5\}$ (with $h'_5$ and $h'_0$), and $\{f_0, f_4\}$ (with $h'_9$). The last three of them are clearly maximal, hence they correspond to the lower covers of $c_8$ whose intents are exactly the intent of that concept augmented by the generating matchfields ($c_2, c_{10},$ and $c_9$, respectively).

---

Algorithm 1: Lattice construction algorithm

--- input: $\mathcal{K}(\mathcal{F}, \mathcal{H}, \mathcal{M})$
output: Set of linked concepts C 1  ConceptQueue $\leftarrow \{(\mathcal{F}, \mathcal{F}'')\}$;
2  while ConceptQueues $\neq \emptyset$ do
3  $\quad$ c = $(F_c, H_c) \leftarrow$ ConceptQueue.pop( );
4  $\quad$ Children $\leftarrow \emptyset$;
5  $\quad$ foreach h in $\mathcal{H} - H_c$ do
6  $\quad\quad$ $F_h = F_c \cap h'$;
7  $\quad\quad$ if $\exists \tilde{c} \in$ Children s.t. $E_{\tilde{c}} = F_h$ then
8  $\quad\quad\quad$ $E_{\tilde{c}} \leftarrow E_{\tilde{c}} \cup \{h\}$;
9  $\quad\quad$ else
10 $\quad\quad\quad$ Children $\leftarrow$ Children $\cup \{(F_h, H_c \cup \{h\})\}$
11 $\quad$ $\tilde{c} \leftarrow$ max(Children);
12 $\quad$ C $\leftarrow$ C $\cup \tilde{c}$;

---

Maintaining Lattices Upon Context Evolution

According to one embodiment of the invention, the lattice can be incrementally updated in scenarios that include adding a new object (How) or, dually, a new attribute (match field).

Formally, it is assumed that a new flow, e.g., $f_n$, completes the system whose context was previously $\mathcal{K}(\mathcal{F}, \mathcal{H}, M)$. The resulting context, $\mathcal{K}_n(\mathcal{F}_n, \mathcal{H}_n, M_n)$ is such that $\mathcal{F}_n = \mathcal{F} \cup \{f_n\}$, $\mathcal{H}_n = \mathcal{H}$ and $M_n = M \cup \{f_n\} \times f'_n$. In short, the flow set is extended by one new row in the cross-table but the part corresponding to the previously existing flows remains unchanged. For instance, assume that a new flow, $f_8$ with matchfields $h_2, h_7$ and $h_9$ is added to the context of our running example, as presented in FIG. 5.

Regarding the concept lattice of $\mathcal{K}_n$, e.g., $\mathcal{C}_{\mathcal{K}_n}$, it may well be computed from scratch, yet a smarter approach derives it from the readily available structure $\mathcal{C}_{\mathcal{K}}$. Mathematically speaking, $\mathcal{C}_{\mathcal{K}}$ is isomorphic to a suborder from $\mathcal{C}_{\mathcal{K}_n}$, i.e., all the concepts of the former poset "exist" in the latter (although not necessarily in exactly the same composition). This means that computation-wise, we only need to add to the data structure representing $\mathcal{C}_{\mathcal{K}}$ a few new nodes (plus minor adjustments) to make that structure represent $\mathcal{C}_{\mathcal{K}_n}$. The result of such a restructuring operated on the lattice from FIG. 4 is visualized in FIG. 6. Notice that concept numbers work as identifiers: concepts with the same numbers in both figures have the same intents. To ease comprehension, only relevant concepts are provided with intents and extents (full extents and intents are provided).

The following describes an outline of the overall incrementing approach for incrementing lattice maintenance. The approach is based on the stable dimension of the context, the matchfield set $\mathcal{H}$, and focuses on the closure family $\mathcal{C}^h_{\mathcal{K}_n}$. A basic fact is that all intents from $\mathcal{C}^h_{\mathcal{K}}$ are also intents in $\mathcal{C}^h_{\mathcal{K}_n}$.

Property 1.3

Given $\mathcal{K}(\mathcal{F}, \mathcal{H}, M)$ and $f_n$, in the corresponding extended context $\mathcal{K}_n(\mathcal{F}_n, \mathcal{H}_n, M_n)$ holds:

$$\mathcal{C}^h_{\mathcal{K}} \subseteq \mathcal{C}^h_{\mathcal{K}_n}$$

The incremental approach computes $\mathcal{C}^h_{\mathcal{K}_n}$ from $\{f_n\}'$, the matchfield set of the new flow, and $\mathcal{C}^h_{\mathcal{K}}$ instead from plain $M_n$. $\mathcal{C}^h_{\mathcal{K}}$. The result is that new closure missing from $\mathcal{C}^h_{\mathcal{K}}$ can be computed by pairwise intersection of $\{f_n\}'$ with members of the former set. Indeed, exploring the same observation on intents as above, an intent from the larger context is a row intersection involving either exclusively rows from the smaller context or a possibly empty subset of such rows plus the new row.

Property 1.4

Given $\mathcal{K}(\mathcal{F}, \mathcal{H}, M)$ and $f_n$, in the corresponding extended context $\mathcal{K}_n(\mathcal{F}_n, \mathcal{H}_n, M_n)$ holds:

$$\mathcal{C}^h_{\mathcal{K}_n} = \mathcal{C}^h_{\mathcal{K}} \cup \{\{f_n\}' \cap H | H \in \mathcal{C}^h_{\mathcal{K}}\}.$$

Correspondingly, the extents of concepts in $\mathcal{C}_{\mathcal{K}_n}$ have only two possible forms: F or F∪{$f_n$} where F is a previous extent, i.e., F∈ $\mathcal{C}^f_{\mathcal{K}}$. For instance, $c_{20}$ has an extent $\{f_0, f_4, f_8\}$ which is exactly the extent of the previously existing concept $c_9$, augmented by the new flow $f_8$. In summary, a significant amount of work could be saved by avoiding the total regeneration of all previously existing intents from $\mathcal{C}^h_{\mathcal{K}}$.

Regarding the computation of the missing intents from $\mathcal{C}^h_{\mathcal{K}_n}$, it is noteworthy that intersections H of an intent $H_0$ from $\mathcal{K}$ and $\{f_n\}'$ can either represent a new closure, i.e., H was not closed in $\mathcal{K}$ but is now in $\mathcal{K}_n$, or correspond to an old closed set. In the first case, a new concept will have to be created with H as intent, whereas in the second, the already existing concept, with H as its intent, will have to be updated by adding $f_n$ to the extent. For instance, in our running example, the concepts $c_{19}$ to $c_{22}$ (see FIG. 6) have been newly generated within the extended context whereas $c_{22}$ is the flow concept of the new flow $f_8$. Their respective intents are all the intersections of the matchfield set of $f_8$, i.e., $f_8' = \{h_2, h_7, h_9\}$, with the intents from our initial context $\mathcal{K}$. These are, $\{h_2\}$, $\{h_7, h_9\}$, $\{h_2\}$, and $\{h_2, h_7, h_9\}$, respectively. Except for these concepts, two other concepts, already in the initial lattice, now comprise $f_8$ in their respective extents: $c_4$ and $c_u$, i.e., the modified concepts.

A major problem here arises from multiple generations: an intersection H may be obtained from several existing intents. For instance, the new intent $\{h_7, h_9\}$ can be the intersection of $f_8'$ with either of the intents of $c_0$ and $c_9$ ($\{h_1, h_4, h_7, h_9\}$ and $\{h_1, h_7, h_9\}$, respectively). Hence, the effective creation of the underlying concept $c_{20}$ need to be performed only once, with the right intent (concept) from $\mathcal{K}$. Furthermore, the extents of the newly created concepts need to be computed as well. A key mathematical result states that all one needs to care about is the concept with the minimal intent $H_m$, from $\mathcal{K}$ that generates a given intersection H (which is, therefore, maximal among all such concepts). The uniqueness of such $H_m$ is rooted in the fact that it is the closure of H in $\mathcal{K}$, i.e., $H_m = H''$. For instance, in our running example, the closure of the new intent $\{h_7, h_9\}$ is $\{h_1, h_7, h_9\}$ from the concept $c_9$. It is noted that this works even for H which are closed in $\mathcal{K}$. For instance, the empty set is a valid intersection of the new intent with, e.g., $\{h_{10}\}$ from concept $c_6$, yet the maximal concept for it is the top one, i.e. $c_4$.

As indicated in the introduction to this section, match field-wise increments of the lattice work dually, i.e., through the family of extents $\mathcal{C}^f_{\mathcal{K}}$. Moreover, removing a flow f match field amounts to factor out the structure by removing the concepts that have become obsolete and by dropping the removed element from the remaining concepts that still bear it.

2. The FlowME Framework

In this section, the FlowME framework is described in more detail based on the above-described theoretical analysis and results.

TABLE 1

| Notations | | | |
|---|---|---|---|
| $I_c$ | Concept c Intent | $E_c$ | Concept c Extent |
| v(c) | Concept c query vector | Q | Set of user queries |
| g(c) | Flows grounded in c | |.| | The cardinality of a set |
| t(c) | Queries targeted by c | T | Set of Target concepts |
| P | Set of Projection concepts | G | Set of Ground concepts |

Flow Concepts Generation

The input data to the FlowME framework includes flow entries and user queries. A query is a conjunction of matchfield descriptors. Queries share flows in their respective flow sets and that shared semantics can be reflected in counter assignment to flows. Initial data preparation for FlowME includes generating the complete lattice $\mathcal{L}_{\mathcal{K}}$ of flow entries denoted $\mathcal{F}$ and their matchfield values denoted $\mathcal{H}$.

Measurement Structure Generation

A main function of the FlowME framework is to produce groups of disjoint set of flow entries to be managed by one counter for each group instead of per-flow counter assignment. Given a concept $\mathcal{C}_{\mathcal{K}}$ and a list of user queries Q, the flowset partition identification algorithm (Algorithm 2) passes through concept lattice to identify target concepts T, projection concepts P and ground concepts G. A concept (F, H)∈ $\mathcal{C}_{\mathcal{K}}$ is composed of a set of matchfield values H ⊂ $\mathcal{H}$ and a group of flows F ⊂ $\mathcal{F}$ that match with H. The algorithm sorts the concepts list C in decreasing order w.r.t. the number of flows to be sure of finding the largest groups with minimum effort. Based on queries and the concept lattice, the algorithm finds the set of ground concepts. Flow entries grounded to the same ground concept form the same partition and are then managed by the same counter.

Algorithm 2 is described in detail below. The query vector for a concept c, v(c) is an N-bit string that indicates whether the query $q_i$ is answered by the concept c intent $I_c$:

$$v(c)[i] = \begin{cases} 1, & \text{if } q_i \subseteq I_c \\ 0, & \text{otherwise} \end{cases} \quad 1 \leq i \leq N$$

Vector values are computed in Algorithm 2 (line 7) by performing a logical OR operation on the query vectors of the concept c initialized with possible target queries (line 5) and the vectors of its parents concepts.

A concept c is identified as a target concept when it is the first concept to match with a query q∈Q. In order to generate the target concept list T, the algorithm maintains a list of user queries Q, and whenever a target concept is found, the corresponding query q is removed from the query list. Target counters identification ends when query list Q is emptied.

Projection concepts p∈P represent arbitrary infimums of target concepts, hence their extents are intersections of target concept extents. In FIG. 4, $c_{10}$ is a projection since it is the infimum (i.e., greatest lower bound) of the target concepts $c_8$ and $c_6$. A concept is identified as a projection concept if no immediate superior projection concept has a richer set of queries. This can be verified rapidly in Algorithm 2 (line 8) by comparing the vector cardinality to the maximum query vector cardinality in ĉ (line 8). Indeed, the query vector of $c_{10}$ is of size three which is more than the respective vector sizes of its upper covers $c_6$ and $c_8$ (one and two, respectively). Finally, based on a flow concept c(F, H) where |F|=1, a projection concept is considered ground concept if it has the same set of queries 12).

For a specific context of flow entries set $\mathcal{F}$ and user queries Q, the underlying hardware infrastructure maintains counters for groups of flows defined by the ground concept's intents:

$$F_g = \{F \subseteq \mathcal{F} \mid \exists (F,H) \in G_Q\}$$

One hardware counter is assigned per group of flow entries. The number of counters is then $N = |F_g|$. Note that since the groups are disjoint and no flow entry participate in more than one group, $N \le |\mathcal{F}|$ in worst case, the number of counters to maintain is equal to the number of flow. Flow entries $f_6$ and $f_7$ participate to the ground concept $c_6$ and then forms a partition of two flow entries. Flows $f_0$, $f_1$, $f_2$, $f_3$, $f_4$ and $f_5$ participate in independent ground concepts and then each of them forms a partitions of one flow entry.

Query Concepts and their Semi-Lattice

The above framework can be enhanced with a new aspect pertaining to queries. We assume a list of potential user queries, e.g., Q, and examine the way they relate to the concepts from $\mathcal{C}_\mathcal{K}$. As a simplifying hypothesis, we posit the complete compliance of Q to the descriptive language induced by the context, i.e., $Q \subseteq \wp(\mathcal{H})$. In other words, each user query q is made exclusively of match fields that belong to $\mathcal{H}$.

Similar to single match fields from $\mathcal{H}$, each q may be mapped to a unique concept of the lattice, called hereafter its target concept, that is identified by the closure q'':

Definition

Given a query $q \subseteq \mathcal{H}$, its target concept within the context $\mathcal{K}(\mathcal{F}, \mathcal{H}, M)$ is defined as follows:
$$\gamma: \wp(\mathcal{H}) \to \mathcal{C}_\mathcal{K} \text{ with } \gamma(q) = (\{q\}', \{q\}'')$$

---

Algorithm 2: Flowset partition identification algorithm input: A list of concepts C,
       A set of queries $Q = (q_1, \ldots, q_i, \ldots, q_n)$
output: Target, projection and ground sets (T, P, G)

1  Sort(C);
2  foreach c in C do
3  │  for $q_i$ in Q do
4  │  │  if $q_i \subseteq I_c$ then
5  │  │  │  v(c)[i] ← 1;
6  │  │  └  T ← T ∪ {c}; Q ← Q − {$q_i$};
7  │  v(c) ← v(c) ∪ $\bigcup_{\bar{c} \in c^*}$ v($\bar{c}$);
8  │  if |v(c)| > max$_{\bar{c} \in c^*}$ (|v($\bar{c}$)|) then
9  │  │  P ← P ∪ {c};
10 │  if $|I_c| = 1$ then
11 │  │  for p ∈ P do
12 │  │  │  if v(p) = v(c) then
13 │  │  │  └  G ← G ∪ {p}; break( );

---

By its very definition, the target concept of a query q satisfies the following properties: (i) its intent is the closure of q within the context $\mathcal{K}$, and (ii) its extent is the answer flow set of q. For instance, with the sample set of queries and the lattice in FIG. 4, $\gamma(q_2) = c_5$, $\gamma(q_3) = c_8$, and $\gamma(q_5) = c_8$. The three answer sets are respectively $\{f_2, f_3\}$ and $\{f_0, f_1, f_4, f_5\}$ (twice).

A corollary of the above properties is that whatever the query $q \subseteq \mathcal{H}$ is, its answer flow set necessarily appears in the lattice.

Corollary 2.1

The concept lattice comprises all potential answer flow sets for queries from $\mathcal{H}$.

Thus, storing the entire lattice can help answer the queries in a more efficient manner (provided a low-cost target concept lookup mechanism is designed). Moreover, due to the factorization within the concept lattice, queries from the same closure-induced equivalence class will share the target concept and hence the answer set (e.g., see $q_3$ and $q_5$ above). It is noteworthy, that this also holds for queries that are not in the initial set Q, but could be introduced at a later step. Thus, such new queries, provided they remain within $\wp$, do not generate any computational overhead on the concept set.

From a more statistics-oriented standpoint, concepts may be considered as the basis for packet counter assignments. Assuming that each flow increments at most one counter, a natural goal would be to assess the minimal number of counters required in the answers of all queries from Q. To formally ground our reasoning, we first establish a support structure for Q within the concept lattice. Its basis is the set of all target concepts from $\mathcal{C}_\mathcal{K}$ which will be denoted, through a notation overload, as $\gamma(Q)$.

Definition

Given a query set $Q \subseteq \wp(\mathcal{H})$, its target concept set within the context $\mathcal{K}(\mathcal{F}, \mathcal{H}, M)$ is defined as follows:

$$\gamma(Q) = \{\gamma(q) \mid q \in Q\},$$

In the running example, $\gamma(Q) \{c_2, c_5, c_6, c_8\}$. Clearly, a rough approximation of our final solution would be to assign a counter to each concept from $\gamma(Q)$. Such a solution would have the advantage of providing the statistics with no computational overhead. Yet this means that whenever a flow belongs to the extents of at least two target concepts (e.g., $f_5$ is in both $c_6$ and $c_8$), it should contribute to as many counters (hence incur some processing overhead), which is a breach of the above single-counter constraint. Hence a more purposeful solution would require managing the intersections of target concept extents so that each flow is assigned a unique smallest subset whose counter it should increment. Query statistics can then be computed by summing up the counters corresponding to the relevant subsets of its extent flowset.

The above reasoning leads us to a definition of a family of As that represent the answer sets of queries from Q and (at least some) intersection thereof. A first result about the underlying structure is that it must comprise all intersections of target concept extents. Indeed, it is easily seen that the above reasoning could be inductively applied to first-order intersections, then to second-order ones, so forth, until all possible intersections are proven to require consideration for counter assignment. Following the definition of the concept lattice, all these intersections correspond to concepts from $\mathcal{C}_\mathcal{K}$ (they correspond to all arbitrary meets of concepts from $\gamma(Q)$). Hence, a new lattice sub-structure is defined which is induced by $\gamma(Q)$ through arbitrary meets:

Definition

Given a query set $Q \subseteq \wp(\mathcal{H})$, its projection concept set within the context $\mathcal{K}(\mathcal{F}, \mathcal{H}, M)$ is defined as follows:

$$\gamma(Q)^\wedge = \{\wedge X \mid X \subseteq \gamma(Q); X \ne \emptyset\},$$

The projection set of our sample queries is $\gamma(Q)^\wedge = \{c_1, c_2, c_3, c_5, c_6, c_7, c_8, c_{10}\}$. Moreover, the projection set of a query set Q forms a meet semi-lattice with respect to the order in the concept lattice, since its respective family of extents is closed by intersection. Therefore, the resulting substructure is called $\mathcal{L}_{|Q} = \gamma(Q)^\wedge, \le_\mathcal{K})$ the projection semi-lattice.

Next, consider the mapping of flows to projection concepts. A basic observation shows that for a flow f that belongs to at least one projection concept, there is always a unique minimal such concept in $\gamma(Q)^\wedge$.

Property 2.2

Given a flow f from the context $\mathcal{K}(\mathcal{F}, \mathcal{H}, M)$ and a query set $Q \subseteq \wp(\mathcal{H})$ where at least one q covers f the concept $\wedge \{(F, H) | (F, H) \in \gamma(Q)^\wedge; f \in F\}$ is the minimal projection concept comprising f.

An auxiliary function is defined that maps each flow f to the minimal projection concept comprising it. For completeness, if no projection concept has f, it is mapped to the lattice top.

Definition

The functions $\mu_{|Q}: \mathcal{F}(Q)^\wedge \cup \{T\}$ maps a flow f into the its ground concept:

$$\mu_{|Q}(f) = \wedge \{(F,H) | (F,H) \in \mathcal{L}_{|Q}; f \in F\}.$$

The values of $\mu_{|Q}$ for the running example are as follows:

$(f_0, c_2); (f_1, c_3); (f_2, c_5); (f_3, c_7); (f_4, c_8); (f_5, c_{10});$
$(f_6, c_6); (f_7, c_6).$

The minimal projection concept of a flow f is a canonical representative for the set of all concepts from $\gamma(Q)^\wedge$ that comprise f.

Property 2.3

Given two flows $f_1, f_2 \in \mathcal{F}$ the following equivalence holds:

$$\mu_{|Q}(f_1) = \mu_{|Q}(f_2) \textit{ iff } \{(F,H) | (F,H) \in \mathcal{L}_{|Q}; f_1 \in F\} = \{(F,H) | (F,H) \in \mathcal{L}_{|Q}; f_2 \in F\}.$$

It is noted that for a given f, the set $\{(F, H) | (F, H) \in \mathcal{L}_{|Q}; f \in F\}$ is exactly the set $\{c | c \in \gamma(Q)^\wedge; \mu_{|Q}(f) \leq_\mathcal{K} c\}$, i.e., the set of all projection concepts greater or equal to the minimal one for f.

In a way similar to the definition of the target concept set for queries, we define the set of all minimal projection concepts for flows, called ground projections.

Definition

Given a query set $Q \subseteq \wp(\mathcal{H})$, its ground projection concept set within the context $\mathcal{K}(\mathcal{F}, \mathcal{H}, M)$ is defined as follows:

$$\mu_{|Q}(\mathcal{F}) = \{\mu_{|Q}(f) | f \in \mathcal{F}\} - T.$$

In the running example, the above set covers the projection semi-lattice almost completely: $\mu_{|Q}(\mathcal{F}) = \{c_2, c_3, c_5, c_6, c_7, c_8, c_{10}\}$. Yet in a more realistic settings, only a fraction thereof will be made of ground projections.

Counter Assignment and Minimality Results

The FlowME framework provides a counter assigning principle for $\mathcal{F}$ based on $\gamma(Q)^\wedge$. The ground projections in $\mu_{|Q}(\mathcal{F})$ are the only concepts assigned a counter each while ignoring the remaining members of $\mathcal{C}_\mathcal{K}$. This explains why the top concept had to be excluded. Now, with this counter assignment, a particular flow f is to be "wired" to the counter of its $\mu_{|Q}(f)$ (whenever different from T). Thus it only reports to a single statistics. Moreover, the exact statistics of each projection concept c, inclusive the target ones in $\gamma(Q)$, are obtained by summing up the values of all the counters corresponding to sub-concepts and then adding its own counter, if c is itself a ground projection.

Property 2.4

The set of counters corresponding to the concepts in $\mu_{|Q}(\mathcal{F})$ is the minimal one that ensures the exact answer of all the queries in Q.

We have proved this property by reduction ad absurdum. We have shown that there is no smaller set of counters that can correctly answer all queries from a given set Q. The proof is not described herein.

Evolving the Query and Flow Sets

In practice, the environment represented by the concepts is dynamic and subjects to frequent changes. Realistic change scenarios include launching previously unseen queries, adding/removing flows, inserting additional match fields, e.g., following the launch of a new query, etc.

The FlowME framework performs incremental updates to a lattice structure upon a change to a flow entry while minimizing the corresponding lattice restructuring efforts. An example lattice structure updating algorithm for adding a flow entry (Algorithm 3) is provided herein. Lattice update algorithms for other scenarios, such as deleting a flow entry, can be similarly devised. The algorithm restructures the projection semi-lattice, as the semi-lattice of extents corresponds to projection concepts. The algorithm updates the concept lattice when a new flow entry is added to the context. In the following, a new flow entry $f_8$ with matchfields $\{h_2, h_7, h_9\}$ is added to the initial context (FIG. 5). A basic property is that the new concept lattice should contain all intersections of the new flow matchfields denoted $\{f_n\}'$ with old concepts intents. First, if a concept c contains already the intersection H, then $f_n$ is added to c extents (line 5). That is the case of concept $c_{12}$

---

Algorithm 3: Lattice update: Add a flow input: Added flow entry $f_n$
input/output: Concept lists (C, T, P, G)

1  $C_n \leftarrow \emptyset; M \leftarrow \emptyset;$
2  foreach c = $(E_c, I_c)$ in C do
3      $H \leftarrow I_c \cap f_n'$;
4      if $H = I_c$ then
5         $c \leftarrow (E_c \cup \{f_n\}, I_c); M \leftarrow M \cup \{c\};$
6      else if $!\exists \bar{c} \in C_n \cup M$ s.t. $I_{\bar{c}} = H$ then
7         $C_n \leftarrow C_n \cup \{c_n = (E_c \cup \{f_n\}, H)\};$
8         $\check{c} \leftarrow \check{c} \cup \{c_n\}; c_n^{\check{}} \leftarrow c_n^{\check{}} \cup \{c\};$
9         UpdateOrder($c_n$, c, $C_n$, M);
10        UpdateStatus($c_n$, c, T, P, G);
11 $c_p \leftarrow$ Lookup(P, v($\mu(f_n)$)); //Ground of $f_n$
12 $g(c_p) \leftarrow g(c_p) \cup \{f_n\};$
13 $G \leftarrow G \cup \{c_p\};$
14 $C \leftarrow C \cup C_n;$

--- where $H_{c_{12}} \cap \{f_8\}' = H_{c_{12}}$, thus, concept $c_{12}$ is updated in the new context by adding $f_8$ to its extents. Second, if H is not present in the old lattice, the algorithm uses the actual concept c to generate a new concept $c_n$ with the H as intent and $f_n$ and $E_c$ as extents (line 7). Concept c is called the genitor of $c_n$. In the running example as shown in FIG. 6, the genitors of concepts $c_{19}, c_{20}, c_{21}, c_{22}$ are $c_8, c_9, c_5$ and $c_1$, respectively.

In the running example of FIG. 6, the concepts $c_{19}$ to $c_{22}$ have been newly generated within the extended context whereas $c_{22}$ is the flow concept of the new flow $f_8$. Their respective intents are all the intersections of the matchfield set of $f_8$, i.e., $f'_8 = \{h_2, h_7, h_9\}$, with the intents from the initial context $\mathcal{K}$. These are, $\{h_7\}, \{h_7, h_9\}, \{h_2\}$, and $\{h_2, h_7, h_9\}$, respectively. Next, the algorithm positions the new concept $c_7$, in its genitor c parent's set and positions the genitor c as child of $c_n$ (line 8). The result of such a restructuring operated on the lattice from FIG. 4 is visualized in FIG. 6. It should be noted that concept hers work as identifiers: concepts with the same numbers in both figures have the same intents. To ease comprehension, only relevant concepts are provided with intents and extents (full extents and intents are provided). Finally, the ground concept of the new flow $f_a$ is the projection concept $c_p \in P$ that have the same query vector as the flow concept $\mu(f_n)$ (line 11). In our example, $v(\mu(f_8))=v(c_{22})=00001$ is the same as the projection $c_{19}$ query vector. The new flow $f_8$ is grounded to $c_{19}$ (line 13).

---

Algorithm 4: UpdateStatus: Update support structure

--- input/output: concepts c, $c_n$ (the new and its genitor)
Concept sets (T, P, G)

1  foreach $q \in t(c)$ do
2     if $q \subseteq H$ then
3        $t(c_n) \leftarrow t(c_n) \cup \{q\}$; $t(c) \leftarrow t(c) - \{q\}$;
4  if $t(c_n) \neq \emptyset$ then $T \leftarrow T \cup \{c_n\}$;
5  if $t(c) = \emptyset$ then $T \leftarrow T - \{c\}$;
6  if $|v(c_n)| > \max_{\bar{c} \in c_n^*}(|v(\bar{c})|)$ then
7     $P \leftarrow P \cup \{c_n\}$;
8     if $|v(c)| = |v(c_n)|$ then
9        $P \leftarrow P - \{c\}$;
10       if $g(c_n) \neq \emptyset$ then
11          $g(c_n) \leftarrow g(c); g(c) \leftarrow \emptyset$;
12          $G \leftarrow G \cup \{c_n\} - \{c\}$;

---

The UpdateStatus procedure, presented in Algorithm 4, is called whenever a new concept is added to the lattice to update its status i.e., target, projection, or ground, and the status of its genitor. In our example, the newly created concept $c_{19}$ answers $q_5 = \{h_7\}$, thus, $q_5$ will be targeted to $c_{19}$ and removed from its genitor $c_8$ targeted queries set (line 3). Projection concepts are identified analogically to Algorithm 2. Next, the genitor of the new concept $c_n$, is no longer considered as projection if it has the same number of queries as $c_n$. Finally, if there is a flow grounded to the new concept, then the algorithm moves all grounded flows of the genitor to the new concept. As a result of the restructuring in the extended lattice example, the modified concepts are $c_4$ and $c_{12}$. The new target concept list is $T^+ = T \cup \{c_{19}\}$. The new projection concept list is $P^+ = P \cup \{c_{19}\}$. The new ground concept list is $G^+ = G \cup \{c_{19}\}$.

FIG. 7 is a block diagram illustrating a computing device 700 for performing the operation of the FlowME framework according to one embodiment. The computing device 700 assigns hardware counters to flows passing through a switch 740 for performing measurement at the switch 740. In one embodiment, the computing device 700 may be part of the switch 740; in alternative embodiments, the computing device 700 may be part of a server computer coupled to the switch 740, or part of a controller coupled to the switch 740 in a split structure network).

In one embodiment, the switch 740 includes a flow table memory 750 that stores flow entries, and hardware counters 760 for measuring network traffic. In one embodiment, the hardware counters 760 may be implemented by registers or random access memory (RAM), such as dynamic random access memory (DRAM), static random access memory (SRAM), or other types of RAM. It is understood that the switch 740 includes other components that are not described herein.

In one embodiment, the computing device 700 includes input circuitry 710 to receive flow entries and a set of user queries, each user query specifying a set of the flow attributes to be measured. The computing device 700 also includes a processor 720 coupled to the input circuitry 710. In one embodiment, the processor 720 includes a concept generator module 711 adapted to construct a lattice of interconnected concepts based on the flow entries, where each concept describes a subset of the flows and a subset of the flow attributes. The processor 720 also includes a flowset builder module 712 adapted to identify disjoint flowsets from the lattice based on the set of user queries. At least one of the flowsets includes more than one flow to thereby enable sharing of the hardware counters among the flows belonging to the same flowset. The processor 720 also includes a counter placement module 713 adapted to assign one hardware counter to each flowset. The computing device 700 also includes output circuitry 730 coupled to the processor 720 to output a mapping between flow identifiers and hardware counter identifiers to the switch 740 for assignment of the hardware counters 760.

In one embodiment, the computing device 700 also includes a statistics management module 714 that collects the traffic measurements made by the hardware counters 760 of the switch 740, and generates answers to the user queries. In alternative embodiments, the statistics management module 714 may be located within the switch 740 or other network nodes coupled to the switch 740 (a controller, a server computer, etc.). It is understood that the computing device 700 includes other components that are not described herein.

Figure 8:
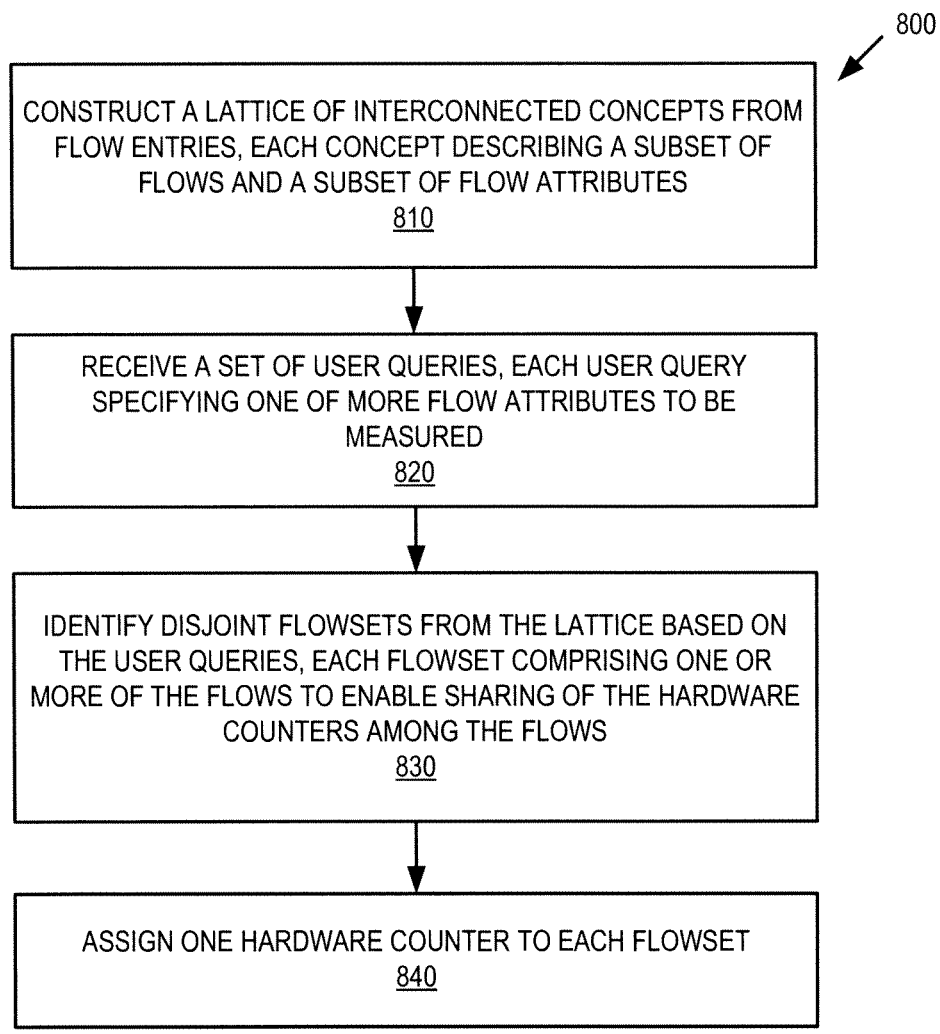
FIG. 8 is a flow diagram illustrating a method for assigning hardware counters according to one embodiment of the invention.

FIG. 8 illustrates one embodiment of a method 800 for assigning hardware counters. In one embodiment, the method 800 may be performed by a computing device, such as the computing device 700 of FIG. 7.

In one embodiment, a lattice of interconnected concepts is constructed by a processor (of a computing device) based on flow entries, which are received by the processor and available at the switch (block 810). Each concept describes a subset of the flows and a subset of the flow attributes. The processor also receives a set of user queries (block 820), each user query specifying a set of the flow attributes to be measured. Based on the set of user queries, the processor identifies disjoint flowsets from the lattice (block 830). Each flowset includes one or more of the flows to enable sharing of the hardware counters among the flows. The processor then assigns one hardware counter to each flowset (block 840).

Figure 9:
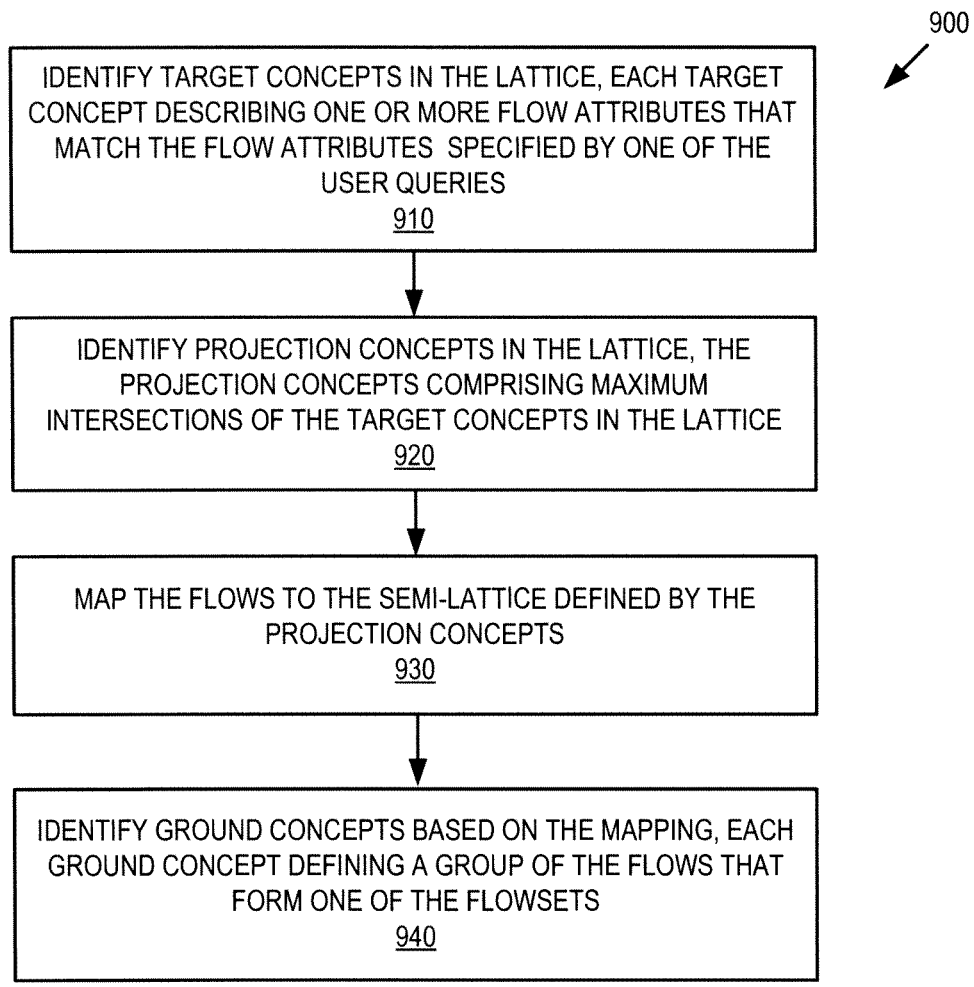
FIG. 9 is a flow diagram illustrating a method for building flowsets according to one embodiment of the invention.

FIG. 9 illustrates one embodiment of a method 900 for building flowsets. In one embodiment, the method 800 may be performed by a computing device, such as the computing device 700 of FIG. 7.

In one embodiment, a processor (of a computing device) identifies a set of target concepts in the lattice (block 910). Each target concept describes one or more flow attributes that match the set of the flow attributes specified by one of the user queries. The processor also identifies projection concepts in the lattice (block 920). The projection concepts include maximum intersections of the target concepts in the lattice. The processor then maps flows (described in the flow entries) to a semi-lattice defined by the projection concepts (block 930), and identifies ground concepts based on the mapping (block 940), where each ground concept defines a subset of the flows that form one of the flowsets.

The operations of the diagrams of FIGS. 8 and 9 have been described with reference to the exemplary embodiment of FIG. 7. However, it should be understood that the operations of the diagrams of FIGS. 8 and 9 can be performed by embodiments of the invention other than those discussed with reference to FIG. 7, and the embodiment discussed with reference to FIG. 7 can perform operations different than those discussed with reference to the diagrams of FIGS. 8 and 9. While the diagrams of FIGS. 8 and 9 show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end station, a network node). Such electronic devices store and transmit (internally and/or with other electronic devices over a network) code (composed of software instructions) and data using computer-readable media, such as non-transitory tangible computer-readable media (e.g., computer-readable storage media such as magnetic disks; optical disks; read only memory; flash memory devices) and transitory computer-readable transmission media (e.g., electrical, optical, acoustical or other form of propagated signals such as carrier waves, infrared signals). In addition, such electronic devices typically include a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges termed as controllers). Thus, a non-transitory computer-readable medium of a given electronic device typically stores instructions for execution on one or more processors of that electronic device. One or more parts of an embodiment of the invention may be implemented using different combinations of software, firmware, and/or hardware.

As used herein, a network node (e.g., a router, switch, bridge, controller) is a piece of networking equipment, including hardware and software, that communicatively interconnects other equipment on the network (e.g., other network nodes, end stations). Some network nodes are multiple services network nodes that provide support for multiple networking functions (e.g., routing, bridging, switching, Layer 2 aggregation, session border control, Quality of Service, and/or subscriber management), and/or provide support for multiple application services (e.g., data, voice, and video).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of assigning hardware counters to flows that pass through a switch in a communication network for performing traffic measurement at the switch, wherein each of the flows is associated with a set of flow attributes, the method comprising the steps of:
   constructing, by a processor, a lattice of interconnected concepts from flow entries available at the switch, each concept describing a subset of the flows and a subset of the flow attributes;
   receiving by the processor a set of user queries, each user query specifying one or more of the flow attributes to be measured;
   identifying disjoint flowsets from the lattice based on the user queries, each flowset comprising one or more of the flows to enable sharing of the hardware counters among the flows; and
   assigning one hardware counter to each flowset.

2. The method of claim 1, wherein the step of identifying disjoint flowsets further comprises the steps of:
   identifying target concepts in the lattice, each target concept describing one or more flow attributes that match the flow attributes specified by one of the user queries; and
   identifying projection concepts in the lattice, the projection concepts comprising intersections of the target concept extents in the lattice.

3. The method of claim 2, further comprising the steps of:
   mapping the flows to a semi-lattice defined by the projection concepts; and
   identifying ground concepts based on the mapping, each ground concept defining a group of the flows that form one of the flowsets.

4. The method of claim 1, wherein the assigned hardware counters are a minimum set of counters for answering the user queries.

5. The method of claim 1, further comprising the step of incrementally updating the lattice and the disjoint flowsets in response to an update to the flow entries.

6. The method of claim 5, wherein the update to the flow entries includes adding or deleting a flow, or adding or deleting a flow attribute.

7. The method of claim 1, wherein the hardware counters are programmable for measuring traffic of any one of the flowsets.

8. The method of claim 1, wherein constructing a lattice further comprises the steps of:
   forming a two-dimensional context from the flow entries, the context having a flow dimension and a flow attribute dimension and a plurality of context entries, each context entry indicating one of the flows and corresponding flow attributes; and
   mapping the context to the lattice.

9. The method of claim 1, further comprising the steps of:
   receiving by the processor measurements generated by the hardware counters from the switch; and
   providing answers to the user queries based on the measurements.

10. A computing device in a communication network, the computing device to assign hardware counters to flows that pass through a switch for performing traffic measurement at the switch, wherein each of the flows is associated with a set of flow attributes, the computing device comprising:
    input circuitry to receive flow entries available at the switch and a set of user queries, each user query specifying one or more of the flow attributes to be measured;
    a processor coupled to the input circuitry, the processor comprising:
       a concept generator module adapted to construct a lattice of interconnected concepts from the flow entries, each concept describing a subset of the flows and a subset of the flow attributes,
       a flowset builder module adapted to identify disjoint flowsets from the lattice based on the user queries, wherein each flowset comprises one or more of the flows to enable sharing of the hardware counters among the flows, and
       a counter placement module adapted to assign one hardware counter to each flow, and
    output circuitry coupled to the processor to output a mapping between flow identifiers and hardware counter identifiers to the switch for assignment of the hardware counters.

11. The computing device of claim 10, wherein the flowset builder module is further adapted to identify target concepts in the lattice, each target concept describing one or more flow attributes that match the flow attributes specified by one of the user queries, and to identify projection concepts in the lattice, the projection concepts comprising maximum intersections of the target concepts in the lattice.

12. The computing device of claim 11, wherein the flowset builder module is further adapted to map the flows to the semi-lattice defined by the projection concepts, and to identify ground concepts based on the mapping, each ground concept defining a group of the flows that form one of the flowsets.

13. The computing device of claim 10, wherein the assigned hardware counters are a minimum set of counters for answering the user queries.

14. The computing device of claim 10, wherein the processor is further adapted to incrementally update the lattice and the disjoint flowsets in response to an update to the flow entries.

15. The computing device of claim 14, wherein the update to the flow entries includes adding or deleting a flow, or adding or deleting a flow attribute.

16. The computing device of claim 10, wherein the hardware counters are programmable for measuring traffic of any one of the flowsets.

17. The computing device of claim 10, wherein the flowset builder module is further adapted to form a two-dimensional context from the flow entries, the context having a flow dimension and a flow attribute dimension and a plurality of context entries, each context entry indicating one of the flows and corresponding flow attribute, and to map the context to the lattice.

18. The computing device of claim 10, wherein the processor further comprises a statistics management module adapted to receive measurements generated by the hardware counters from the switch, and to provide answers to the user queries based on the measurements.

* * * * *

UNITED STATES PATENT AND TRADEMARK OFFICE
CERTIFICATE OF CORRECTION

Page 1 of 3

PATENT NO. : 8,751,645 B2
APPLICATION NO. : 13/554853
DATED : June 10, 2014
INVENTOR(S) : Mounaouar et al.

It is certified that error appears in the above-identified patent and that said Letters Patent is hereby corrected as shown below:

On the title page, in the Figure, delete "PROCESSOR 710" and insert -- PROCESSOR 720 --, therefor.

On the title page, in the Figure, delete "INPUT CIRCUITRY 720" and insert -- INPUT CIRCUITRY 710 --, therefor.

In the Drawings

In Fig. 7, Sheet 5 of 7, delete "PROCESSOR 710" and insert -- PROCESSOR 720 --, therefor.

In Fig. 7, Sheet 5 of 7, delete "INPUT CIRCUITRY 720" and insert -- INPUT CIRCUITRY 710 --, therefor.

In the Specification

In Column 1, Line 40, delete "flows" and insert -- flows, --, therefor.

In Column 3, Line 23, delete "winch" and insert -- which --, therefor.

In Column 3, Line 57, delete "count" and insert -- counter. --, therefor.

In Columns 3 & 4, Lines 57-66 & 1-19, delete "Definitions of………….counter." and insert the same at Line 58, as a new paragraph.

In Column 5, Line 58, delete "factoriztion" and insert -- factorization --, therefor.

In Column 5, Line 65, delete "operator ' a" and insert -- operator ' maps a --, therefor.

Signed and Sealed this
Fourth Day of November, 2014

Michelle K. Lee
*Deputy Director of the United States Patent and Trademark Office*

CERTIFICATE OF CORRECTION (continued)
U.S. Pat. No. 8,751,645 B2

In Column 6, Line 10, delete "operators |" and insert -- operators " --, therefor.

In Column 6, Line 19, delete "$\mathcal{F} \subseteq \wp(C_K^f)$" and insert -- $C_K^f \subseteq \wp(\mathcal{F})$ --, therefor.

In Column 6, Line 27, delete "of ally" and insert -- of any --, therefor.

In Column 6, Line 47, delete "$\langle C_K, \rangle \leq_K$" and insert -- $\langle C_K, \leq_K \rangle$ --, therefor.

In Column 6, Line 63, delete "intent f extent" and insert -- intent/extent --, therefor.

In Column 7, Line 4, delete "of instead" and insert -- of readability, instead --, therefor.

In Column 7, Line 15, delete "external" and insert -- extremal --, therefor.

In Column 7, Line 25, delete "external" and insert -- extremal --, therefor.

In Column 7, Line 63, delete "h'$_0$)," and insert -- h'$_{10}$), --, therefor.

In Column 8, Line 23, delete "(How)" and insert -- (flow) --, therefor.

In Column 9, Line 31, delete "are, {h$_2$}," and insert -- are, {h$_7$}, --, therefor.

In Column 9, Line 34, delete "c$_u$," and insert -- c$_{12}$, --, therefor.

In Column 9, Line 46, delete "H$_m$," and insert -- H$_m$ --, therefor.

In Column 9, Line 59, delete "flow f match" and insert -- flow/match --, therefor.

In Column 10, Line 23, delete "concept C$_K$" and insert -- concept set C$_K$ --, therefor.

In Column 10, Line 67, delete "queries 12)." and insert -- queries as c (line 12). --, therefor.

In Column 11, Line 5, delete "$F_g = \{F \subseteq \mathcal{F} \;\exists (F,H) \in G_Q\}$" and insert -- $F_g = \{F \subseteq \mathcal{F} | \exists (F, H) \in G_Q\}$ --, therefor.

In Column 11, Line 5, delete "$F_g = \{F \subseteq \mathcal{F} \;\exists (F,H) \in G_Q\}$" and insert -- $F_g = \{F \subseteq \mathcal{F} | \exists (F, H) \in G_Q\}$ --, therefor.

CERTIFICATE OF CORRECTION (continued)
U.S. Pat. No. 8,751,645 B2

In Column 12, Line 9, delete "within $\wp$ ," and insert -- within H, --, therefor.

In Column 12, Line 41, delete "As that" and insert -- sets that --, therefor.

In Column 13, Line 14, delete " $\mathcal{F}(Q)^{\wedge} \cup \{T\}$ ," and insert -- $\mathcal{F} \rightarrow \gamma(Q)^{\wedge} \cup \{T\}$ --, therefor.

In Column 14, Line 59, delete "$c_7$," and insert -- $c_n$ --, therefor.

In Column 14, Line 62, delete "concept hers" and insert -- concept numbers --, therefor.

In Column 14, Line 66, delete "$f_a$," and insert -- $f_n$ --, therefor.

In Column 15, Line 32, delete "$c_n$," and insert -- $c_n$ --, therefor.

In Column 15, Line 49, delete "740 in" and insert -- 740 (e.g., in --, therefor.

In Column 16, Line 21, delete "740 (a" and insert -- 740 (e.g., a --, therefor.

In Column 17, Lines 26-27, delete "bridges termed as controllers)." and insert -- bridges (also termed as bus controllers). --, therefor.

In the Claims

In Column 18, Line 61, in Claim 10, delete "flow, and" and insert -- flowset; and --, therefor.